United States Patent [19]

Leemans et al.

[11] Patent Number: 4,908,155

[45] Date of Patent: Mar. 13, 1990

[54] POLYMERIC SURFACTANT

[75] Inventors: Luc E. Leemans, Diepenbeek; Herman J. Uytterhoeven, Bonheiden; Philippe J. Teyssié, Neuville en Condroz; Roger M. Fayt, Neupre; Nikolaas C. de Jaeger, Hove, all of Belgium

[73] Assignee: Agfa-Gevaert, N.V., Mortsel, Belgium

[21] Appl. No.: 120,151

[22] Filed: Nov. 13, 1987

[30] Foreign Application Priority Data

Nov. 21, 1986 [EP]  European Pat. Off. ........ 86202067.4

[51] Int. Cl.$^4$ .................. B01F 17/52; G03C 1/84; C08F 269/00
[52] U.S. Cl. .................... 252/353; 252/351; 252/356; 430/528; 430/529; 430/537; 525/255; 525/261; 525/262; 525/286; 525/327.3
[58] Field of Search ............ 430/537, 529, 528; 524/24; 252/351, 353, 356, 357; 525/255, 259, 261, 286, 330.5, 262, 327.3

[56] References Cited

U.S. PATENT DOCUMENTS

| | | | |
|---|---|---|---|
| 2,810,713 | 10/1957 | Melamed | 525/330.5 X |
| 2,862,893 | 12/1958 | Hwa | 525/330.5 X |
| 2,949,383 | 8/1960 | Blake | 525/330.5 X |
| 3,730,888 | 5/1973 | Buckman et al. | 525/330.5 X |
| 4,199,363 | 4/1980 | Chen | 524/24 X |
| 4,657,983 | 4/1987 | Skiscim | 525/286 X |
| 4,820,619 | 4/1989 | Sanada et al. | 525/327.3 X |

FOREIGN PATENT DOCUMENTS

| | | | |
|---|---|---|---|
| 2506087 | 8/1975 | Fed. Rep. of Germany | 430/528 |
| 8102640 | 9/1981 | PCT Int'l Appl. | 430/537 |

OTHER PUBLICATIONS

Chemical Abstracts, vol. 107, Acq. No. 225988f.

*Primary Examiner*—John F. Terapane
*Assistant Examiner*—Gary L. Geist
*Attorney, Agent, or Firm*—William J. Daniel

[57] ABSTRACT

A surface-active block copolymer which comprises chemically linked polymeric blocks (A) and (B), block (A) of said copolymer consisting of at least one homo- or copolymerized non-polar alpha,beta-ethylenically unsaturated monomer and block (B) of said copolymer is derived by polymerizing an alpha-beta ethylenically unsaturated monomer containing an epoxy group and transforming the epoxy group into an hydroxy-substituted ionic group, preferably an anionic group. These block copolymers are used as dispersing agents in aqueous dispersions, including polymeric latex dispersions, and as plasticizing agent in hydrophilic colloid layers, including colloid layers containing a dispersed light-sensitive silver halide emulsion or other auxiliary substances for photographic materials.

15 Claims, No Drawings

POLYMERIC SURFACTANT

DESCRIPTION

The present invention relates to polymeric surfactants and to hydrophilic colloid compositions incorporating them.

In the dispersing of hydrophobic particles in aqueous media containing a hydrophilic colloid serving eventually as binding agent for the production of waterpermeable hydrophilic colloid layers it is in particular cases advantageous to utilize dispersing agents that do not migrate from the coated layer. Particularly in hydrophilic colloid layers used in photographic silver halide emulsion materials, a poor resistance to diffusion or high mobility of a surfactant is not desirable since the migration of the surfactant to adjacent layers may change photographic properties, produce undesirable foaming in a coating or processing step and reduce the adherence of the hydrophilic colloid layers in photographic films to their hydrophobic film support.

It is an object of the present invention to provide polymeric surfactants that are suited for use as dispersing agents in aqueous media and remain resistant to diffusion in wet hydrophilic colloid layers.

It is another object of the present invention to provide polymeric surfactants operating as plasticizing agents suitable for use in a hydrophilic colloid layer of photographic silver halide emulsion materials.

Other objects and advantages of the present invention will appear from the further description.

In accordance with the present invention a polymeric surfactant is provided which surfactant is a block comprising chemically linked polymeric blocks (A) and (B), wherein the block (A) part of said copolymer consists of at least the homo- or copolymerized apolar, i.e., nonpolar, monomeric Alpha,Beta-ethylenically unsaturated compound, characterized in that the block (B) part of said copolymer consists of polymerized Alpha,Beta-ethylenically unsaturated monomer containing an epoxy group that has been transformed into an ionic group.

According to particular embodiments the epoxy group has been transformed in one of the following groups represented by structural formula (I), (II), (III), (IV), (V), (VI) (VII), (VIII), (IX), (X), (XI) and (XII) :

$$Y^-.H_3N^+—CH_2—CH(OH)— \quad (I)$$

$$Y^-.RN^+H_2—CH_2—CH(OH)— \quad (II)$$

$$Y^-.R_2N^+H—CH_2—CH(OH)— \quad (III)$$

$$Y^-.R_3N^+—CH_2—CH(OH)— \quad (IV)$$

$$X^+.^-O—CO—CH_2—CH(OH)— \quad (V)$$

$$X^+.^-O_3S—CH_2—CH(OH)— \quad (VI)$$

$$X^+.^-O_2S—O—CH_2—CH(OH)— \quad (VII)$$

$$X^+.^-O_3S—O—CH_2—CH(OH)— \quad (VIII)$$

$$2\,X^+.(^-O)_2—\underset{\underset{O}{\|}}{P}—O—CH_2—CH(OH)— \quad (IX)$$

$$X^+.^-O—HP—O—CH_2—CH(OH)— \quad (X)$$

$$2\,X^+.(^-O)_2—\underset{\underset{O}{\|}}{P}—CH_2—CH(OH)— \quad (XI)$$

$$X^+.^-O—\underset{\underset{O}{\|}}{PH}—CH_2—CH(OH)— \quad (XII)$$

wherein:
$Y^-$ is an anion, and
$X^+$ is a cation.

The preparation of these block copolymers proceeds advantageously by anionic polymerization For example the synthesis of these block copolymers proceeds according to one embodiment by preparing an apolar i.e., nonpolar, "living" homo- or copolymer by anionic polymerizaton and by effecting the polymerization of a monomer containing an epoxy group, e.g. glycidyl methacrylate, with said "living" polymer. In a final step the epoxy groups of the thus-obtained blockcopolymer are transformed into one of the above groups by reactions of which examples are given further on.

The term "living polymer" is used for polymers prepared by anionic polymerization wherein no chain termination or chain transfer takes place. In other words the polymer chains retain in anionic polymerization at their growing end a carbanion charge that transfers to further added monomer and so that only the already existing polymer chains grow (ref. Polymeranalytik I by Martin Hoffmann, Herbert Krömer and Rainer Kuhn—George Thieme Verlag, Stuttgart 1977, p. 20-21 and 40).

The anionic polymerization proceeds with anionic polymerization initiators, e.g. alkaline organometal compounds such as n-butyllithium. A preferred initiator for use in the preparation of the blockcopolymers according to the present invention is iso-butyl(Alpha-methylstyrl)lithium.

Iso-butyl(Alpha-methylstyryl)lithium (hereinafter compound (III)) is prepared according to the following reaction scheme:

$$H_3C\diagdown_{H_3C}\!\!\!\diagup\!\!CH—CH_2Li + (n + 1)\,H_2C{=}C\diagup^{CH_3}\!\!\!\diagdown\!\!\!\text{—}\!\!\bigcirc \longrightarrow$$

(I)             (II)

$$H_3C\diagdown_{H_3C}\!\!\!\diagup\!\!CH—CH_2—(CH_2—\underset{\underset{\bigcirc}{|}}{\overset{CH_3}{\overset{|}{C}}})_{\overline{n}}CH_2—\underset{\underset{\bigcirc}{|}}{\overset{CH_3}{\overset{|}{C}}}{}^-.Li^+$$

(III)

wherein n is zero or a positive integer, e.g. 1 to 5.

Iso-butyl(alpha-methylstyryl)lithium is preferred as initiator since it prevents efficiently side reactions in the polymerization of vinyl esters as described in published European patent application 0 076 539 which application more particularly relates to the preparation of copolymers of dienes or aromatic hydrocarbon vinyl compounds and acrylic esters.

The preparation of glycidyl methacrylate is described e.g. in U.S. Pat. No. 2,537,981 (ref. Chem. Abstr. 45, 5177, 1951).

The transformation of the epoxy group into the specified ionic groups can occur according to reaction procedures described in the following references.

The hydroxy-amination of the epoxy group, also called oxirane ring, is described by Kirk-Othmer in "Encyclopedia of Chemical Technology"—Second completely revised edition—Vol. 8—p. 270 and further in J. Polymer Sci.: Symposium No. 47, (1974) p. 158.

The hydroxy-carboxylate formation proceeds with hydrogen cyanide forming a Beta-hydroxynitrile as described by Kirk-Othmer in "Encyclopedia of Chemical Technology"—Second completely revised edition—Vol. 8—p. 272, followed by transformation of the nitrile group in carboxylate group.

The hydroxy-sulfonate formation proceeds according to one embodiment by treating the epoxy group with sulfite anions in the presence of water. According to Everett E. Gilbert in the book "Sulfonation and Related Reactions"—Robert Krieger Publishing Company Huntington, N.Y. (1977), p. 161 $NaHSO_3$ is used in the Beta-hydroxy-sulfonation of the epoxy group and according to Kirk-Othmer in "Encyclopedia of Chemical Technology"—Second completely revised edition—Vol. 8—p. 274 the Beta-hydroxysulfonation proceeds with sulfonic acid.

The hydroxy-sulfate ester formation proceeds with $SO_2$ as described by Kirk-Othmer in "Encylopedia of Chemical Technology"—Second completely revised edition—Vol. 8—p. 274.

The hydroxy-sulfite ester formation proceeds with $SO_2$ as described by Kirk-Othmer in "Encyclopedia of Chemical Technology"—Second completely revised edition—Vol. 8—p. 274.

The hydroxy-phosphate ester formation proceeds with orthophosphoric acid as described in J. Polymer Sci.: Symposium No. 47, (1974) p. 163 or by Kirk-Othmer in "Encyclopedia of Chemical Technology"—Second completely revised edition—Vol. 8—p. 274.

The hydroxy-phosphite ester formation proceeds analogously to the procedure described for hydroxy-phosphate ester formation but using phosphorus acid instead of orthophosphoric acid.

The hydroxy-phosphonate ester formation proceeds with a phosphonic acid analogously to the procedure described for the hydroxy-sulfonic acid ester.

Apolar, i.e., non-polar, monomers used alone or in combination for the formation of the apolar block (A) part in block copolymers according to the present invention belong e.g. to the following classes:
(a) ethylenically unsaturated carboxylic acid esters,
(b) dienes,
(c) ethylenically unsaturated carbonitriles,
(d) vinyl aromatic compounds,
(e) cyclosiloxanes undergoing anionic chain-opening polymerization.

The anionic chain-opening polymerization of cyclosiloxanes is described e.g. in Die Makromolekulare Chemi 176, 1641–1656 (1975).

Specific examples of monomers belonging to one of said classes are listed in the following Table.

TABLE
1. styrene
2. Alpha-methylstyrene
3. lauryl methacrylate
4. 2-ethylhexyl methacrylate
5. methyl methacrylate
6. t.butyl acrylate
7. ethyl acrylate
8. butadiene
9. isoprene
10. allyl methacrylate
11. acrylonitrile
12. hexamethylcyclotrisiloxane The detailed description of particular block copolymers containing epoxy groups serving as intermediate products in the preparation of the ionic block copolymers according to the present invention is given hereinafter in preparations 1 to 10.

PREPARATION 1

Block copolymerisation of styrene and glycidyl methacrylate (GMA) initiated by sec-butyl(alpha-methylstyryl)lithium In a thoroughly dried 3000 ml balloon flask, kept under pressure with nitrogen, fitted with a three way septum equipped valve, 1500 ml tetrahydrofuran (THF) were introduced through the septum by means of a stainless steel capillary. The THF solvent was previously dried on calcium hydride and distilled from benzophenone sodium solution.

To the magnetically stirred solvent, 4 ml (30.8 mmoles) of Alpha-methylstyrene (Alpha-MeSt), previously dried and distilled from calcium hydride and fluorenyl lithium resp., were added through the septum with a nitrogen blanketed syringe.

A 0.58M sec-butyllithium (s-BuLi) solution in heptane was dropwise added to the THF solution at ambient temperature, until appearance of a persistent red coloration due to formation of Alpha-methylstyryl carbanions.

12 ml of said 0.58M s-BuLi solution (6.96 mmoles) were added as the required initiator quantity.

The balloon flask was cooled to −78° C. by immersion in an acetone-DRY ICE bath To the stirred solution at −78° C., 5 ml of styrene (43.6 mmoles) were added. Before addition, styrene was dried and distilled from calcium hydride and subsequently mixed with fluorenyllithium and distilled again.

After 2 hours a 20 ml aliquot was withdrawn from the reactor with a nitrogen blanketed syringe for prepolymer analysis.

Thereupon to the stirred solution 40 ml (293 mmoles) of glycidyl methacrylate (GMA) were added at −78° C. Prior to injection GMA monomer was cooled to about −40° C.

Preceding the addition the GMA was purified by a double fractionated distillation being dried on calcium hydride and further purified by an azeotropic distillation of a toluene-polystyryllithium solution.

After 4 hours the "living" polymer was "killed" by addition of 20 ml of methanol. Part of THF solvent was stripped under vacuum and the polymer was precipitated by slowly pouring in 5 times its solvent volume in methanol. After drying under vacuum 45.9 g of polymer were obtained (yield 92%).

The molecular weight was determined by gel permeation chromatography (GPC) as number average molecular weight ($\overline{Mn}$) and weight-average molecular weight ($\overline{Mw}$).

GPC (polystyrene calibration)

$\overline{Mn} = 14600$
$\overline{Mw} = 25400$
$\overline{Mw}/\overline{Mn} = 1.7$

PREPARATION 2

Block copolymerisation of lauryl methacrylate (LMA) and glycidyl methacrylate (GMA) initiated by sec-butyl(Alpha-methylstyryl)lithium General procedures and operational expermental conditions are the same as in preparation 1 except for differences stated in the following procedure.

In a 4000 ml balloon flask were introduced 2000 ml of THF and 4 ml of Alpha-MeSt at ambient temperature.

A 0.58 mole s-BuLi solution was dropwise added until appearance of a persistant red coloration. 9.86 mmoles of s-BuLi were added as the required initiator quantity.

After cooling the reactor to −20° C., 5 ml (17.2 mmoles) of lauryl methacrylate (LMA) were added. Prior to injection LMA was cooled to about −15° C. After initiation of LMA, visible as a change in colour from red to yellow, the reactor was cooled to −78° C. Before the injection LMA was purified by drying on calcium hydride and distillation followed by addition of triethylaluminium and distillation again.

After 2 hours a 20 ml aliquot was withdrawn for prepolymer analysis. Thereupon 65 ml (476.5 mmoles) of GMA were added and after 4 hours the living polymer was killed and precipitated in methanol. After drying under vacuum 70.72 g of polymer were obtained (yield 94%).
GPC (polystyrene calibration)
$\overline{Mn} = 15700$
$\overline{Mw} = 20700$
$\overline{Mw}/\overline{Mn} = 1.3$

PREPARATIONS 3 and 4

Analogously to the method described in preparation 2 the following block copolymers having different monomer composition as listed hereinafter in Table 1 were prepared.

TABLE 1

| Preparation No. | Monomer composition % by weight | | | GPC-analysis (polystyrene calibr.) | | |
|---|---|---|---|---|---|---|
| | Alpha-MeSt | LMA | GMA | $\overline{Mn}$ | $\overline{Mw}$ | $\overline{Mw}/\overline{Mn}$ |
| 3 | 4.7 | 5.6 | 89.7 | 16,900 | 21,300 | 1.26 |
| 4 | 4.0 | 20 | 76 | 16,000 | 27,300 | 1.71 |

PREPARATION 5

Block copolymerisation of 2-ethylhexyl methacrylate and glycidyl methacrylate initiated by [sec-butyl(Alpha-methylstyryllithium)]

The general procedure and operational experimental conditions were the same as in preparation 1 except for the differences stated in the following procedure.

In a 1000 ml balloon flask were introduced 500 ml of THF and 0.4 ml of Alpha-MeSt at ambient temperature.

A 0.58M s-BuLi solution was dropwise added until appearance of a persistent red colouration. 1.7 ml of said solution corresponding with 0.99 mmoles of s-BuLi were added as the required initiator quantity.

After cooling the reactor to −78° C., 1 ml (4.4 mmoles) of 2-ethylhexyl methacrylate (2-EtHexMA) were added. Prior to injection 2-EtHexMA was cooled to about −40° C. Before addition 2-EtHexMA was dried on calcium hydride and distilled therefrom, whereupon a 1M triethyl aluminium solution in heptane was added dropwise to the cooled monomer (about −40° C.) just until appearance of the greenish colour of the monomer-triethylaluminium complex, and distilled again.

After 2 hours a 20 ml aliquot was withdrawn for prepolymer analysis.

Thereupon 7 ml (36.8 mmoles) of GMA were added and after 3 hours the "living" polymer was "killed" and precipitated in methanol. After drying under vacuum 8.02 g of polymer were obtained (yield 94%).
GPC (polystyrene calibration)
$\overline{Mn} = 16200$
$\overline{Mw} = 23100$
$\overline{Mw}/\overline{Mn} = 1.4$

PREPARATION 6

Block copolymerisation of methyl methacrylate and glycidyl methacrylate initiated by [sec-butyl(Alpha-methylstyryllithium)]

The general procedure and operational experimental conditions were the same as in preparation 1 except for the differences stated in the following procedure.

In a 3000 ml balloon flask were introduced 1500 ml of THF and 5 ml of Alpha-MeSt at ambient temperature.

A 0.58M s-BuLi solution was dropwise added until appearance of a persistent red coloration. 10 ml of said solution corresponding with 5.80 mmoles of s-BuLi were added as the required initiator quantity.

After cooling the reactor to −78° C., 10 ml (93.5 mmoles) of methyl methacrylate (MMA) were added. Prior to injection MMA was cooled to about −40° C. Before addition MMA was dried and distilled from calcium hydride and subsequently mixed with triethylaluminium and distilled again. After 2 hours a 5 ml aliquot was withdrawn for prepolymer analysis. Thereupon 50 ml (367 mmoles) of GMA were added and after 4 hours the living polymer was killed and precipitated in methanol.

After drying under vacuum 63.36 g of polymer were obtained (yield 96%).
GPC (polystyrene calibration)
$\overline{Mn} = 6,600$
$\overline{Mw} = 10,200$
$\overline{Mw}/\overline{Mn} = 1.55$

PREPARATION 7 and 8

Analogously to the method described in preparation 6 the following block copolymers having different monomer composition as listed hereinafter in Table 2 were prepared.

TABLE 2

| Preparation No. | Monomer composition % by weight | | | GPC-analysis (polystyrene calibr.) | | |
|---|---|---|---|---|---|---|
| | Alpha-MeSt | MMA | GMA | $\overline{Mn}$ | $\overline{Mw}$ | $\overline{Mw}/\overline{Mn}$ |
| 7 | 7.02 | 12.63 | 80.35 | 8,100 | 11,000 | 1.36 |
| 8 | 7.4 | 11.4 | 81.2 | 8,900 | 11,500 | 1.29 |

PREPARATION 9

Block copolymerisation of tertiary butyl acrylate and glycidyl methacrylate initiated by [sec-butyl(Alpha-methylstyryllithium)]

The general procedure and operational experimental conditions were the same as described in preparation 1 except for the differences stated in the following procedure.

In a 1000 ml balloon flask were introduced 500 ml of THF and 0.4 ml of Alpha-MeSt at ambient temperature. A 0.58M s-BuLi solution was dropwise added until appearance of a persistent red coloration. s-BuLi solution (0.58M, 2.0 ml, 1.16 mmoles) was added as the required initiator quantity.

After cooling the reactor to $-78°$ C., 10 ml (73.30 mmoles) of GMA were added. Prior to injection GMA was cooled to about $-40°$ C. After 3 hours 20 ml of a toluene solution containing 2.5 ml (17.22 mmoles) of tertiary butyl acrylate (TBA), cooled to $-40°$ C., was introduced into the reactor.

Before addition TBA was dried and distilled from calcium hydride and subsequently mixed with triethylaluminum and distilled again. The toluene was dried by distilling from styryllithium solution. After 2 more hours, the living polymer was killed by precipitation in methanol. Drying under vacuum gave 11.95 g of polymer (yield 95%).

PREPARATION 10

Block copolymerisation of Alpha-methylstyrene (Alpha-MeSt) and glycidyl methacrylate (GMA) initiated by [sec-butyl(Alpha-methylstyryllithium)]

The general procedure and operational experimental conditions were the same as in preparation 6 except for the fact that no methyl methacrylate was added but in the initiation step 5 ml (38.5 mmoles) of Alpha-MeSt and in the next step of the polymerization 40 ml (293 mmoles) of GMA were added.

GPC (polystyrene calibration)

$\overline{Mn} = 11,500$
$\overline{Mw} = 19,300$
$\overline{Mw}/\overline{Mn} = 1.67$ The preparation of sulfonated block copolymers according to the present invention is given hereinafter in preparations 11 and 12. The preparation of block copolymers with quaternary ammonium salt groups is described in preparation 13.

PREPARATION 11

Sulfonation of the block copolymer of glycidyl methacrylate and styrene with sodium sulfite in aqueous medium with tetrabutyl ammonium bromide as phase transfer catalyst 10 g of the block copolymer described in preparation 1 were suspended in a solution of 20 g of sodium sulfite (159 mmoles) and 16.5 g of tetrabutyl ammonium bromide (51 mmoles) in 100 ml of water. The suspension was deaerated by passing a stream of nitrogen gas through it. 10 ml of $CHCl_3$ (125 mmoles) were added and the suspension was heated to 80° C. under nitrogen for 60 hours on oil bath. After the reaction was completed, chloroform was distilled off and the polymer was separated from the salt solution by decantation. Final purification was done by dialysis of an aqueous solution.

PREPARATION 12

Sulfonation of poly[tert. butyl acrylate-b-(glycidyl methacrylate)] and transesterification to form sulfonated poly[ethylacrylate-b-(glycidyl methacrylate)]

The sulfonation of the block copolymer of preparation 9 was performed as described in preparation 11.

The transesterification wherein the tert.butyl acrylate was replaced by ethyl acrylate group proceeded as follows:

5 g of the sulfonated block copolymer containing a polytert.butyl acrylate block were suspended in 200 ml of dry ethanol to which 10 mmoles of hydrochloric acid had been added. The suspension was refluxed for 24 hours and the polymer was recovered by vacuum stripping of the solvent.

PREPARATION 13

Transformation of block copolymer of glycidyl methacrylate with sulfur trioxide amine complex into block copolymer with Beta-hydroxy-trimethylammonium hydrogensulfate groups 5 g of the block copolymer described in preparation 1 were dissolved in 50 ml of dimethyl formamide (DMF). To the stirred solution was added a solution of 11 g (79.04 mmoles) of sulfur trioxide trimethylamine ($SO_3.N(CH_3)_3$ complex in 50 ml DMF. The solution of block copolymer and $SO_3N(CH_3)_3$ in DMF was heated to 120° C. for 90 min. DMF was decanted from the precipitated polymer and a sodium hydroxide solution was added to hydrolyse the intermediate sulfate ester. The polymer was dissolved in water and precipitated from THF for purification.

According to one embodiment the present block copolymers are used as dispersing agents for all kinds of compounds and particles in aqueous media. The present invention includes aqueous liquid compositions containing dispersed particles in the presence of at least one of said block copolymers.

For example, the present block copolymers are used for dispersing all kinds of inorganic or organic substances that are water-insoluble or have a poor water-solubility. For example, they are used for dispersing pigments and hydrophobic compounds, e.g. hydrophobic monomers and hydrophobic polymer particles, water-insoluble dyes and photographic (re)agents, e.g. color couplers that are resistant to diffusion in wet hydrophilic colloid layers. They are particularly useful dispersing agents in the preparation of polymers produced according to the dispersion polymerisation technique (emulsion polymerization and pearl polymerization). When using in block(s) (A) of the block copolymer according to the present invention structural units containing repeating units derived from monomers containing more than one unsaturated bond, as is the case by applying e.g. butadiene, isoprene or allylmethacrylate, the present block copolymers can act as polymeric dispersants that are chemically anchored during the dispersion polymerization to the dispersed polymer. Hereby very stable polymer latex dispersions can be prepared since the polymeric dispersant cannot be desorbed anymore.

According to an other embodiment particular block copolymers according to the present invention are used as diffusion resistant plasticizing agent in hydrophilic colloid layers, e.g. in layers containing gelatin as are present in photographic silver halide emulsion materials. A preferred copolymer for that purpose is a lauryl (meth)acrylate-sulfonated glycidyl methacrylate block copolymer.

A dispersion stabilized with a block copolymer according to the present invention can be incorporated directly into a hydrophilic colloid composition, e.g. a gelatin-containing composition intended to be used in the manufacture of a gelatin-silver halide photographic material, but it is likewise possible to create a stock of a concentrated dispersion in water optionally containing gelatin, and to use parts of this stock whenever required.

Latex particles dispersed with block copolymers of the present invention can be loaded with hydrophobic photographically useful substances as described in the United Kingdom Patent Specifications 1,504,949 and 1,504,950 and the published German Patent Specification (DE-OS2,835,856). This can be accomplished e.g. by gradually adding the latex to a stirred solution of a hydrophobic substance to be loaded onto and/or into the latex particles in a water-miscible organic solvent or in a mixture of such solvents to such an extent that the hydrophobic substance becomes insoluble in the diluted solvent and optionally removing the organic solvent(s) at least partially from the latex. It is believed that during the addition of the aqueous latex to he solution of the hydrophobic substances in the water-miscible solvent, the solution gradually becomes moe hydrophilic so that finally the hydrophobic substance leaves the dissolved state. At this stage many latex particles have been added already to the mixture, which particles start swelling in the water-miscible solvent and thus become receptive towards the hydrophobic substance in undissolved state in such a way that they absorb and/or absorb the hydrophobic substance.

A great variety of hydrophobic organic photographically useful substances can be loaded on the dispersed latex particles. Hydrophobic substances suitable for loading are e.g. hydrophobic color couplers, hydrophobic competing couplers, hydrophobic development-inhibitor-releasing compounds, hydrophobic UV-absorbing compounds, hydrophobic filter dyes, hydrophobic sensitizing agents, hydrophobic color developing agents, hydrophobic black-and-white silver halide developing agents, hydrophobic development-activator-releasing compounds, hydrophobic bleaching-inhibitor-releasing compounds, hydrophobic optical brightening agents, hydrophobic anti-oxidizing agents, hydrophobic silver halide solvents, or hydrophobic dye-releasing agents and mixtures thereof.

The hydrophobic substances loaded on the dispersed latex particles may have a function similar and consequently additive to that of photographically useful units of the latex particles themselves. For instance, the latex particles may have recurring units with a color coupler function and the loaded hydrophobic substance is a color coupler as well, so that by the combined color coupler action an increased color density can be obtained.

Yet, the function of recurring units of the latex particles and the loaded hydrophobic substance may be different as well. For instance, the latex particles may comprise recurring units having a color coupler function, whereas the loaded hydrophobic substance has e.g. a competing coupler function, a DIR-function, an UV-absorbing function, an anti-fogging function or developing function.

The loading may proceed as described hereinbefore from water-miscible organic solvents for the hydrophobic substance to be loaded, e.g. acetone, methyl ethyl ketone, methanol, ethanol, isopropanol, tetrahydrofuran, dimethylsulfoxide, dimethylformamide, and N-methylpyrrolidinone. Mixtures of two or more of these solvents can be used likewise.

The coating or loading of the latex particles with hydrophobic substances does not mean necessarily that the latex particles are no longer available for chemical reaction.

A chemically reactive moiety in the latex polymer may function as a color coupler, a competing coupler, a development accelerator e.g. benzyl-Alpha-picolinium bromide, a foggant including hydrazines and hydrazides, e.g. acetyl-phenylhydrazine, a developing agent, e.g. a hydroquinone, a 1-phenyl-3-pyrazolidinone, ascorbic acid and the like, a fog-inhibiting compound, e.g. a 1-phenyl-5-mercaptotetrazole, a developing inhibitor releasing compound (DIR-compound), a bleaching-inhibitor-releasing compound (BIR-compound), a bleaching-activator-releasing compound (BAR-compound).

The present block copolymers may contain in the apolar part non-ionic photographically useful groups attached to recurring units of their apolar block(s) (A).

Such block copolymer containing photographically useful groups in the apolar block(s) (A) is rendered water-dispersable by the ionic block(s) (B) but remains sufficiently non-migratory for use in water-permeable hydrophilic colloid layers of a photographic silver halide emulsion material, in other words the photographically useful groups remain at the site where they were originally incorporated when not chemically split off in a photographic processing carried out later on.

In the production of block copolymers containing photographically useful groups such as color coupler groups in the apolar block(s) (A) the same monomers can be used as applied in the production of latices containing such groups. Color coupler latices are well known to those skilled in the art and are described e.g. in U.S. Pat. Nos. 3,767,412, 3,926,436, 4,019,908, 4,080,211 and 4,128,427.

By way of example the polymerizable monomers containing a color coupler group may be represented by the following general formula (B):

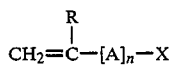

wherein:
R represents hydrogen or a C1-C2 alkyl group,
X represents a color coupler moiety,
A represents a bivalent atom or group, e.g. —O—, —CH$_2$—, —SO$_2$—, —CO—, —COO—, —OOC—, —CONH—, —NHCO—, —NHCONH—, —NHCOO—, —SO$_2$NH—, or an arylene group, and
n is zero or 1.

The color coupler group X may be:
1. a group of cyan-forming color coupler of the phenol or naphthol type e.g. within the scope of the following general formula (I):

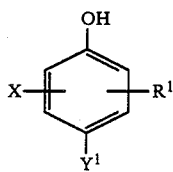

(I)

wherein:
X is a single chemical bond or a bivalent organic group, e.g. —CONH— group of general formula (B),
$R^1$ represents hydrogen, a substituent of the type used in phenol or naphthol color couplers e.g. halogen, alkyl or aryl, aminoacyl or the atoms necessary to complete a fused-on benzene nucleus, which may be substituted, and
$Y^1$ represents a hydrogen atom in the case of 4-equivalent couplers or a substituent that splits off upon color development, thus conferring to the color coupler a 2-equivalent character, e.g. a halogen atom such as chlorine, an acyloxy group, an alkoxy, aryloxy, or heterocycloxy group, an alkylthio, arylthio, or heterocyclic thio group e.g. a tetrazolylthio group or a phenylazo group 2. a group of a magenta-forming color coupler of the pyrazolone or indazolone type e.g. within the scope of the following general formula (II):

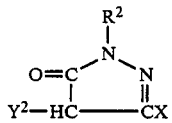

(II)

wherein:
$R^2$ is a substituent of the type used in the 1-position of 2-pyrazolin-5-one color couplers e.g. alkyl or substituted alkyl e.g. haloalkyl such as fluoroalkyl, cyanoalkyl and benzyl, or aryl or substituted aryl e.g. phenyl, which may be substituted by alkyl, halogen, e.g. trichlorophenyl, alkoxy, haloalkoxy, alkyl sulfonyl, haloalkyl sulfonyl, alkylthio, or haloalkylthio,
$Y^2$ is hydrogen in the case of 4-equivalent couplers or a substituent that splits off upon colour development, thus conferring to the color coupler a 2-equivalent character for example a halogen atom e.g. chlorine, an acyloxy group, an alkoxy group, an aryloxy group, or a heterocycloxy group, an aryloxy group, or a heterocycloxy group, an alkylthio group, an arylthio group, or a heterocyclic thio group e.g. a tetrazolylthio or a phenylazo group, and
X has the same meaning as in formula (I).

3. a group of a yellow-forming color coupler of the acylacetamide type, especially the acylacetanilide type e.g. an anilino-carbonylacetophenyl group or a benzoylacetamidophenyl group, wherein both aryl groups may be substituted by substituents well-known in yellow-forming color couplers e.g. alkyl, alkoxy, halogen, alkylthio or alkylsulfonyl, and wherein the active methylene group may carry a substituent conferring to the color coupler a 2-equivalent character for example a halogen atom, e.g. chlorine, acyloxy, an alkoxy, aryloxy, or heterocycloxy group, an alkylthio, arylthio or heterocyclic thio group.

The monomer including a photographically useful group can likewise be a monomeric DIR-compound, BIR-compound, and BAR-compound formed from a known DIR-, BIR- and BAR-compound. DIR-, BIR- and BAR-compounds are well known in the photographic art and are compounds which by an elimination reaction during photographic processing release a development inhibitor, bleach inhibitor or bleach accelerator. These compounds include the well-known classes of couplers e.g. as referred to thereinbefore, which carry at their coupling position a group which upon being split off by reaction of the coupler with oxidized deveoping agent, forms a development inhibitor, bleach inhibitor or bleach accelerator.

Examples of DIR-compounds are described by Barr et al., in Photographic Science and Engineering Vol. 13, no. 2, March-April 1969 p. 74–80, and ibidem no. 4, July-August 1969, p. 214–217, in the U.S. Patent Specifications 3,148,062-3,227,554-3,617,291 and the published German Patent Applicaton DE-OS 2,414,006. BIR-compounds are described e.g. in the U.S. Pat. Nos. 3,705,799 and 3,705,803 and the published German Patent Applications DE-OS 2,405,279-2,412,078 and 2,412,610.

Other bleach inhibitor releasing compounds for use with silver halide emulsion layers are compounds releasing a bleach inhibitor upon alkaline development in the areas where the silver image is formed. Such compounds are described e.g. in the U.S. Pat. No. 3,705,801.

The BAR-compounds may be of the same type as described hereinbefore for the BIR-compounds with the difference that the image-wise releasable bleach inhibitor moiety is now bleach accelerator moiety. In this connection there can be referred to Research Disclosure October 1973, Disclosure no. 11449 and the published German Patent Application DE-OS 2,547,691.

The block copolymers according to the present invention containing a color coupler group can be characterized by their so-called equivalent molecular weight. By equivalent molecular weight is understood the number of grams of polymer containing 1 mole of polymerized monomeric compound with monomeric coupler. It can be compared with the molecular weight of the non-polymeric classical couplers. The equivalent molecular weight of polymeric color coupler compounds may vary within very wide limits, e.g. from 200 to 2000.

The present invention includes the use of the block copolymers according to the present invention in a hydrophilic colloid layer. They are particularly well miscible with gelatin. They are used advantageously in the preparation of hydrophilic colloid layers of photographic elements of the silver halide emulsion type. Such hydrophilic colloid layers are e.g. a light-sensitive silver halide emulsion layer, a subbing layer, an antistress layer, an antihalation layer or any other auxiliary layer of the photographic element. The concentration of the block copolymer may be adapted as desired. The said block copolymers can be mixed homogeneously with hydrophilic colloids without special mixing techniques before their coating as a layer In the preparation of silver halide photographic materials containing block copolymers according to the present invention various silver halides can be used as light-sensitive substance. For instance silver bromide, silver iodide, silver chloride or mixed silver halides such as silver chlorobromide, silver bromoiodide, and silver chlorobromoiodide can be employed.

The hydrophilic colloid used as the vehicle for the silver halide can be, e.g., gelatin, colloidal albumin, zein, casein, a cellulose derivative, a synthetic hydrophilic colloid such as polyvinyl alcohol or poly-N-vinylpyrrolidinone. If desired, a compatible mixture of two or more of these colloids can be employed for dispersing the silver halide.

The light-sensitive silver halide emulsions used in the preparation of a photographic material according to the present invention can be sensitized chemically as well as optically. They can be sensitized chemically by carrying out the ripening in the presence of small amounts of sulfur-containing compounds such as allyl thiocyanate, allyl thiourea, or sodium thiosulfate. The silver halide emulsions can also be sensitized by means of reducing agents e.g. tin compounds as described in the French Patent Specification 1,146,955 and in Belgian Patent Specification 568,687, imino-aminoethane sulfinic acid compounds as described in United Kingdom Patent Specification 789,823 and small amounts of noble metal compounds such as gold, platinum, palladium, iridium, ruthenium, and rhodium compounds. They can be sensitized optically by means of cyanine and merocyanine dyes.

The said silver halide emulsions can also comprise compounds that sensitize the emulsions by development acceleration e.g. compounds of the polyoxyalkylene type such as alkylene oxide condensation products as described among others in U.S. Pat. Nos. 2,531,832-2,533,990, in United Kingdom Patent Specifications 920,637-940,051-945,340-991,608 and 1,091,705, and onium derivatives of amino-N-oxides as described in United Kingdom Patent Specification 1,121,696.

Further, the silver halide emulsions may comprise stabilizers e.g. heterocyclic nitrogen-containing thioxo compounds such as benzothiazoline-2-thione and 1-phenyl-2-tetrazoline-5-thione and compounds of the hydroxytriazolopyrimidine type. They can also be stabilized with mercury compounds such as the mercury compounds described in Belgian Patent Specifications 524,121-677,337 in the United Kingdom Patent Specification 1,173,609.

The light-sensitive silver halide photographic materials incorporating at least one of the present block copolymers may comprise also any other kind of substance known in the art as ingredient for photographic silver halide materials, e.g. plasticizers, hardening agents and/or wetting agents and other ingredients described for the preparation and composition of photographic silver halide materials disclosed e.g. in Research Disclosure No. 17,643 of December 1978.

The silver halide emulsions can be coated on a wide variety of supports. Typical supports include cellulose ester film, polyvinylacetal film, polystyrene film, polyethylene terephthalate film and related films of resinous materials, as well as paper and glass.

The following Examples 1 and 16 illustrate respectively the use of the present block copolymers in the preparation of polymer latices by emulsion polymerization and for the plasticization of a hydrophilic colloid layer.

EXAMPLES 1 to 10

The general procedure of the latex preparation is exemplified by the preparation of a polyethyl acrylate latex.

The latex preparation of ethyl acrylate (EA) proceeded batchwise.

In a reaction flask provided with a reflux condenser, nitrogen introduction tube, thermometer and stirring system a specific amount of EA (see table 3) was introduced. Further a specific amount of block copolymer as dispersant (see Table 3) was introduced together with 100 mg of initiator $K_2S_2O_8$ (i.e. 0.5% by weight with respect to the EA monomer) dissolved in water. Thereupon to the reaction mixture a sufficient amount of distilled water was added to obtain a total volume of 100 ml. The reaction mixture was heated to 80° C. while stirring for 1h. After cooling the obtained latex was filtered and the yield of latex (see Table 3) was determined gravimetrically. The average latex particle size was determined with a commerical apparatus suited therefor.

TABLE 3

| Example No. | sulfopolymer derived from epoxy-polymer of preparation No. | % weight of block copolymer with respect to EA | weight of block copolymer (g) | weight of EA (g) | yield (%) |
|---|---|---|---|---|---|
| 1 | 1 | 8.5 | 1.57 | 18.48 | 87.3 |
| 2 | idem | 2.25 | 0.45 | 20 | 86.3 |
| 3 | 2 | 8.66 | 1.6 | 18.48 | 87.2 |
| 4 | idem | 2.22 | 0.41 | 18.48 | 92.6 |
| 5 | 3 | 5.4 | 1 | 18.48 | 95 |
| 6 | idem | 2.7 | 0.5 | 18.48 | 95.9 |
| 7* | 6 | 2.7 | 2 | 73.92 | 100 |
| 8 | 7 | 5.4 | 1 | 18.48 | 97.5 |
| 9 | idem | 2.7 | 0.5 | 18.48 | 97.5 |
| 10 | 8 | 2.7 | 0.5 | 18.48 | 91.7 |

In Preparation 7* distilled water was added up to 400 ml.

The obtained latices represent very stable polymer dispersions even during a long period of storage and are perfectly miscible with gelatin.

EXAMPLES 11 to 16

An aqueous solution of gelatin was mixed with a latex prepared as described in one of the examples 1 to 10 or with a block copolymer of one of the preceding preparations in a ratio by weight as indicated in the following Table 4.

The obtained mixtures were coated at 50° C. with doctor blade system to obtain films having a thickness (in dry state) of 20 μm.

A rectangular teststrip of the obtained films was subjected to a strain test to define the elasticity modulus (Young's modulus) expressed in N/m2. The lower the value of said modulus the higher the plasticity or deformability of the layer and the higher the plasticizing effect of the added latex or block copolymer.

TABLE 4

| Example No. | Type of latex or block copolymer of: | % wt. of polymer with respect to gelatin | E-modulus ($10^6$ N/m2) |
|---|---|---|---|
| 11 (blank) | — | — | 4,000 |
| 12 | Example 1 | 25 | 2,710 |
| 13 | Example 2 | 25 | 2,500 |
| 14 | Example 3 | 25 | 2,650 |
| 15 | Example 4 | 25 | 2,590 |
| 16 | Preparation 4 | 50 | 2,100 |

We claim:

1. A block copolymer prepared by anionic polymerization comprising polymeric blocks (A)x and (B)y, wherein block (A)x is directly chemically linked at one end thereof to one end of block (B)y, the block (A)x of said copolymer consisting of recurring units A of at least one homo- or copolymerized non-polar alpha, beta-ethylenically unsaturated monomer and the block (B)y of said copolymer consists of recurring units B each containing a hydroxy-substituted ionic group, said recurring unit B being derived from an epoxy-substituted alpha-beta-ethylenically unsaturated monomer, and x and y are integers and are sufficiently large that block (A)x and block (B)y constitute a hydrophobic group and a hydrophilic group, respectively, and the block copolymer as a whole exhibits surface-active properties in aqueous media, is miscible with hydrophilic colloids and aqueous media containing such colloids, and is resistant to diffusion from water-wet hydrophilic colloid layers containing the same, said ionic group of recurring units B corresponding to one of the following structural formulae (I), (II), (III), (IV), (V), (VI), (VII), and (VIII):

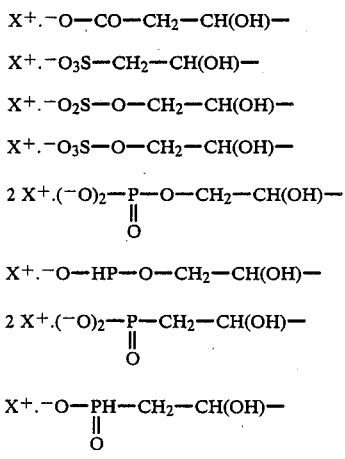

wherein: $X^+$ is a cation.

2. A surface-active block copolymer according to claim 1, wherein said epoxy-substituted monomer is glycidyl methacrylate.

3. A surface-active block copolymer according to claim 1, wherein said non-polar monomer comprises a monomer containing more than one unsaturated bond.

4. A surface-active block copolymer according to claim 1, wherein said non-polar monomer is selected from the following classes:
(a) ethylenically unsaturated carboxylic acid esters,
(b) dienes,
(c) ethylenically unsaturated carbonitriles, and
(d) vinyl aromatic compounds.

5. A surface-active block copolymer according to claim 1, wherein said non-polar monomer is selected from the following group:
i. styrene
ii. Alpha-methylstyrene
iii. lauryl methacrylate
iv. 2-ethylhexyl methacrylate
v. methyl methacrylate
vi. t. butyl acrylate
vii. ethyl acrylate
viii. butadiene
ix. isoprene
x. allyl methacrylate, and
xi. acrylonitrile.

6. A hydrophilic colloid layer comprising hydrophilic colloid and a block copolymer according to claim 1.

7. A hydrophilic colloid layer according to claim 6, wherein said block copolymer is prepared by anionic polymerization.

8. A hydrophilic colloid layer according to claim 6, wherein said epoxy-substituted monomer is glycidyl methacrylate.

9. A hydrophilic colloid layer according to claim 6, wherein the non-polar monomer of said block (A) of said block copolymer comprises a monomer containing more than one unsaturated bond.

10. A hydrophilic colloid layer according to claim 6, wherein said non-polar monomer of said block (A) of said block copolymer is at least one monomer selected from the following classes:
(a) ethylenically unsaturated carboxylic acid esters,
(b) dienes,
(c) ethylenically unsaturated carbonitriles, and
(d) vinyl aromatic compounds.

11. A hydrophilic colloid layer according to claim 6, wherein said non-polar monomer of said block (A) of said block copolymer is at least one monomer selected from the following group:
i. styrene
ii. Alpha-methylstyrene
iii. lauryl methacrylate
iv. 2-ethylhexyl methacrylate
v. methyl methacrylate
vi. t. butyl acrylate
vii. ethyl acrylate
viii. butadiene
ix. isopropene
x. allyl methacrylate and
xi. acrylonitrile.

12. A hydrophilic colloid layer according to claim 6, wherein said hydrophilic colloid comprises gelatin.

13. A hydrophilic colloid layer according to claim 6, which further comprises a silver halide emulsion dispersed within said colloid.

14. A hydrophilic colloid layer according to claim 6, wherein said layer is a light-sensitive silver halide emulsion layer, a subbing layer, an antistress layer, an antihalation layer or another photographic auxiliary layer.

15. A hydrophilic colloid layer as in claim 6, which further comprises polymeric latex particles.

* * * * *